(12) United States Patent
Kesselgruber et al.

(10) Patent No.: US 8,204,650 B2
(45) Date of Patent: Jun. 19, 2012

(54) ACTIVE CHASSIS STABILIZATION SYSTEM

(75) Inventors: Dirk Kesselgruber, Montabaur (DE);
Harry A. Hunnicutt, Austin, TX (US)

(73) Assignee: TRW Automotive GmbH (DE)

( * ) Notice: Subject to any disclaimer, the term of this patent is extended or adjusted under 35 U.S.C. 154(b) by 983 days.

(21) Appl. No.: 11/792,131

(22) PCT Filed: Dec. 1, 2005

(86) PCT No.: PCT/EP2005/012842
§ 371 (c)(1),
(2), (4) Date: Jul. 9, 2008

(87) PCT Pub. No.: WO2006/058747
PCT Pub. Date: Jun. 8, 2006

(65) Prior Publication Data
US 2009/0138156 A1    May 28, 2009

(30) Foreign Application Priority Data
Dec. 3, 2004   (DE) .................. 10 2004 058 441

(51) Int. Cl.
*B60G 17/016* (2006.01)
(52) U.S. Cl. ........................................ 701/38
(58) Field of Classification Search ............ 701/38, 701/39; 280/5.501, 5.502, 5.506, 5.507, 280/5.508
See application file for complete search history.

(56) References Cited

U.S. PATENT DOCUMENTS

| | | | |
|---|---|---|---|
| 5,735,540 A | 4/1998 | Schiffler | |
| 7,487,973 B1 * | 2/2009 | Kesselgruber et al. | .... 280/5.506 |
| 2003/0047898 A1 | 3/2003 | Nagy et al. | |
| 2007/0013151 A1 | 1/2007 | Grethel et al. | |
| 2009/0045361 A1 * | 2/2009 | Nolle et al. | ............ 251/12 |

FOREIGN PATENT DOCUMENTS

| | | |
|---|---|---|
| DE | 43 27 044 A1 | 2/1995 |
| DE | 43 37 764 A1 | 6/1995 |
| DE | 196 49 187 A1 | 5/1998 |
| DE | 198 46 394 C1 | 3/2000 |
| DE | 100 09 918 A1 | 9/2001 |
| DE | 103 34 705 A1 | 2/2004 |
| DE | 103 60 231 A1 | 7/2005 |
| DE | 10 2005 000 889 A1 | 8/2005 |
| EP | 0 992 376 B1 | 4/2000 |
| EP | 0992376 A2 | 4/2000 |
| EP | 1 175 307 A1 | 1/2002 |
| EP | 1 175 307 B1 | 1/2002 |
| EP | 0 992 376 B1 | 6/2003 |
| JP | 2002114144 A | 4/2002 |
| WO | WO 03/101768 A1 | 12/2003 |
| WO | WO 2004/085178 A1 | 10/2004 |
| WO | WO 2005/072999 A1 | 8/2005 |

OTHER PUBLICATIONS

Chinese Office Action in counterpart Application No. 200580047697.7 dated Mar. 27, 2009.

* cited by examiner

*Primary Examiner* — Faye M. Fleming
(74) *Attorney, Agent, or Firm* — MacMillan, Sobanski & Todd, LLC

(57) ABSTRACT

The invention relates to an active chassis stabilization system including a hydraulic pressure supply unit, a hydraulic stabilizer assembly which is associated with a front axle, a hydraulic stabilizer assembly which is associated with a rear axle, and a control unit. The active chassis stabilization system is a two-channel system.

27 Claims, 3 Drawing Sheets

ACTIVE CHASSIS STABILIZATION SYSTEM

CROSS-REFERENCE TO RELATED APPLICATIONS

This application is a National Stage of International Application No. PCT/EP2005/012842 filed Dec. 1, 2005, the disclosures of which are incorporated herein by reference, and which claimed priority to German Patent Application No. 10 2004 058 441.9 filed Dec. 3, 2004, the disclosures of which are incorporated herein by reference.

BACKGROUND OF THE INVENTION

The invention relates to an active chassis stabilization system including a hydraulic pressure supply unit, a hydraulic stabilizer assembly which is associated with a front axle, a hydraulic stabilizer assembly which is associated with a rear axle, and a control unit.

Generic active chassis stabilization systems are used by the majority of motor vehicle manufacturers in an increasing number of their models. Owing to the demand for increased comfort when travelling, an increased safety requirement and increasingly developed sensor arrangements, active chassis stabilization systems are becoming increasingly popular to support the passive components of the chassis. The passive components such as spring elements or dampers merely react to loads or forces which act on the vehicle. In active chassis, hydraulic or pneumatic actuators are usually installed, which are coupled with the passive components of the chassis. These actuators may be associated with an axle or else with the individual wheels of the vehicle. The vehicle data received by various sensors are converted by the vehicle electronics into actuating signals for the actuators. These then actively influence the behaviour of the chassis in accordance with the respective driving situation.

Such a chassis stabilization system in accordance with the current prior art is disclosed in WO 03/101768 A1. The chassis stabilization system described there associates a hydraulic actuator respectively with the front and the rear axle. The actuators are activated via an integrated control unit, the control unit representing the interface between the vehicle sensor arrangement and the hydraulic circuit of the chassis stabilization system. The integrated control unit is a compact component here, which receives both all the control valves of the hydraulic circuit and also the electronics for switching these valves.

In the currently known chassis stabilization systems, the possibility exists for switching the actuator/actuators of the front axle with the actuator/actuators of the rear axle in parallel or in cross-over, with the front and rear axles always being controlled with the same pressure.

The active chassis stabilization system counteracts rolling moments, i.e. moments about the longitudinal axis of the vehicle, e.g. as a result of travelling around a bend. In some embodiments, a pitching of the vehicle, i.e. a movement about the transverse axis of the vehicle, can be counteracted. Now it would be desirable to extend the degrees of regulating freedom of the active chassis stabilization system such that, for example, a control moment which counteracts a rolling moment is not imperatively divided in half between the front and rear axles. Owing to the usually stronger stress of the front axle, it would be suitable to also counteract this stress with a higher pressure than on the rear axle.

The use of two separate control circuits for the front axle and the rear axle would suggest itself. Apart from the economic aspect, namely the doubled effort for such a chassis stabilization system, the lack of available space also argues against such a solution. In addition, an integrated solution with a compact control unit, as shown in WO 03/101768 A1, would be unthinkable.

BRIEF SUMMARY OF THE INVENTION

An object of the invention is therefore the provision of an active chassis stabilization system in which the controlling of the front axle is uncoupled from the controlling of the rear axle with minimal additional technical expenditure.

For this purpose, the active chassis stabilization system according to the invention is constructed as a two-channel system. Here, a first channel A is associated with the stabilizer assembly of the front axle and a second channel B is associated with the stabilizer assembly of the rear axle. The stabilizer assembly of the rear axle can be addressed independently of the stabilizer assembly of the front axle via the two control channels A, B in connection with suitable hydraulic valves.

The control unit of the active chassis stabilization system can have an 8/2-way valve which determines the through-flow paths for the two control channels. Nothing has changed, compared with the prior art, as regards the basic coordination between the stabilizer assemblies, i.e. therefore as regards the general direction of movement of the actuators in various driving situations. Owing to the 8/2-way valve, this fundamental chassis coordination can also be regulated for the two-channel system according to the invention with one component, as before.

The control unit may have two electromagnetically actuated servo valves for switching the 8/2-way valve. As the entire volume of fluid for controlling the stabilizer assemblies flows through the 8/2-way valve, a direct switching of this valve entails difficulties. Relatively large coils would be necessary for an electromagnetic control, which coils would, when they were activated, also extract a correspondingly high amount of power from the vehicle electrics. The servo valves have only a small through-flow and can be switched electromagnetically in an accordingly simple manner. The valve with the high through-flow is then switched via a pressure connection which can be released by the servo valve.

The control unit can have a pressure-limiting valve. Thereby, it is possible to avoid undesirably high pressures in the hydraulic circuit of the active chassis stabilization system.

In a preferred embodiment, the pressure-limiting valve is a proportional pressure-limiting valve. Through the use of a proportional valve, this valve can already be controlled such that precisely the pressure is available at the stabilizer assemblies which is necessary as a result of the sensor data.

The control unit preferably has an electromagnetically actuated servo valve to control this pressure-limiting valve. Just as in the above-mentioned 8/2-way valve, the pressure-limiting valve also has a high through-flow. A servo control is therefore suitable, for the above-mentioned reasons.

The servo valve may be a proportional 2/2-way valve here. The servo control of a proportional valve should likewise suitably take place through a proportional valve. A proportional 2/2-way valve presents itself owing to its small overall size. As a function of the electromagnetic servo control, this valve then continuously frees a pressure connection, which then likewise continuously switches the proportional pressure-limiting valve.

In one embodiment, the pressure-limiting valve controls the pressure level for the stabilizer assemblies of the front- and rear axles. Thereby, the maximum pressure level necessary for the entire hydraulic circuit is established by a valve.

Preferably, the control unit also has a pressure-reducing valve. The installation of such a pressure-reducing valve offers the advantage that an established pressure in the hydraulic circuit, or in parts thereof, can be reduced.

In a preferred embodiment, the pressure-reducing valve is a proportional pressure-reducing valve. This offers the advantage that the pressure in the hydraulic circuit or in the parts of the circuit which are influenced by the pressure-reducing valve, can be controlled continuously and in accordance with requirements.

An electromagnetically actuated servo valve can likewise be provided for controlling the pressure-reducing valve. The pressure-reducing valve also presents itself for a servo control owing to the high volume throughput, for the above-mentioned reasons.

The servo valve may be a proportional 2/2-way valve. For the same reasons as for the pressure-limiting valve, a proportional servo control also presents itself for the pressure-reducing valve, in particular for a proportional pressure-reducing valve.

In a preferred embodiment, the pressure-reducing valve controls the pressure level for the stabilizer assembly of the rear axle. Thereby, a desired uncoupling effect of the front and rear axles occurs. In this case, only the pressure level of the rear axle could be lowered compared with a given pressure level.

The servo valves of the pressure limiting valve and of the pressure reducing valve can be identical. This offers the advantage that the manufacturer has to store a smaller variety of individual components.

The control unit of the active chassis stabilization system may have a 4/2-way valve, which is preferably a failure safety valve, and connects its four connections in a damped manner in a basic position. Through this measure, the 2-channel chassis stabilization system according to the invention is brought into a defined state in the case of a breakdown of the system and the vehicle continues to be kept ready to operate.

The control unit may have two electromagnetically actuated servo valves for switching this 4/2-way valve. A direct switching is also difficult here owing to the high through-flow. Therefore, the small servo valves, which are able to be simply controlled electromagnetically, undertake the switching function for the 4/2-way valve.

The 4/2-way valve may have a device for manual actuation. This function facilitates the filling of the hydraulic circuit with fluid.

Preferably, although not necessarily, the servo valves for switching the 8/2-way valve and the 4/2-way valve are identical. As these valves may, in addition, be identical in construction to ABS valves in braking systems, through this measure the variety of the individual components which are to be stored becomes smaller for the manufacturer.

In one embodiment of the active chassis stabilization system, the control unit has at least one pressure sensor per control channel. Such a pressure sensor provides the vehicle electronics with an indication of the applied pressure in the corresponding control channel. The vehicle electronics can then compare the corresponding actual pressure with a nominal pressure and react accordingly.

Preferably, although not necessarily, a pressure- or position sensor is provided, in order to establish the switching position of the 8/2-way valve. This also serves to check the system, in which valve positions, pressure conditions and sensor data are compared continuously.

In a particularly preferred embodiment, the control unit has at least one electromagnetically actuated valve and a valve housing which receives and couples all the hydraulic valves of the control unit. Thereby, all the control units of the hydraulic circuit are combined in a compact manner in one component, the valve housing. This is very advantageous for fault-finding, repairs, maintenance, etc.

This valve housing may have two pressure connections for coupling with the pressure supply unit and two operating connections for coupling with the stabilizer assemblies respectively. Thereby, the entire hydraulics of the control unit are combined in one compact component and can be very easily exchanged completely by means of the available connections in the case of malfunctioning.

In one embodiment, the control unit has an electronic switching device. Hereby, the control unit develops into an interface between the vehicle electronics and the chassis hydraulics.

The electronic switching device preferably has a connection for the current supply and to receive sensor data. Mostly, the electronic switching device has coils, in addition, to actuate electromagnetically actuated valves. Thereby, the control unit is the central location for the collection and evaluation of the sensor data, the conversion into hydraulic control instructions and the switching of the hydraulic valves. This considerably simplifies the search for faults for mechanics, workshops etc.

In a preferred embodiment, the electronic switching device is detachably connected with the valve housing. This facilitates the exchange of the electronics without having to interfere with the hydraulic circuit.

The active chassis stabilization system may have a maximum of four main valves which control the volume flow for the stabilizer assemblies. In contrast to the servo valves or pilot valves, in this context the valves with a high volume throughput are designated as main valves. In the preferred embodiment, these four main valves are: a pressure-limiting valve, a pressure-reducing valve, a failure safety valve and an 8/2-way valve. Thereby, the technical expenditure has scarcely increased compared with known 1-channel systems and nevertheless an uncoupling of the front and rear axles is possible.

Advantages of this invention will become apparent to those skilled in the art from the following detailed description of the preferred embodiments, when read in light of the accompanying drawings.

DETAILED DESCRIPTION OF THE INVENTION

Figure 1:
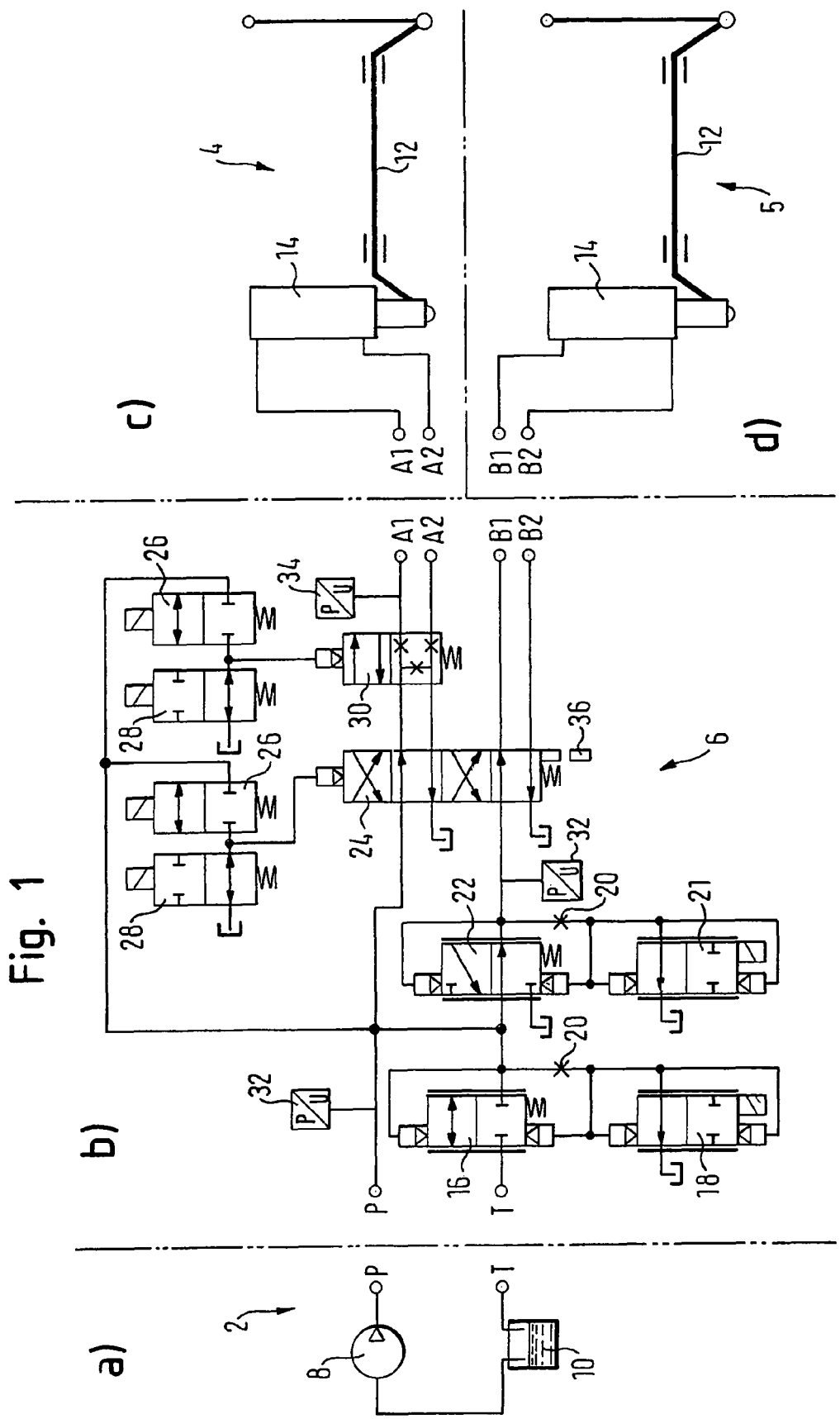
FIGS. 1a-1d show a circuit diagram of a hydraulic circuit for an active chassis stabilization system according to the invention.

FIG. 1 shows the circuit diagram of an active chassis stabilization system including a hydraulic pressure supply unit 2 (FIG. 1a), a hydraulic stabilizer assembly 4 which is associated with a front axle (FIG. 1c), a hydraulic stabilizer assembly 5 which is associated with a rear axle (FIG. 1*d*), and a control unit 6 (FIG. 1*b*). The hydraulic pressure supply unit 2 comprises a hydraulic pump 8 which pumps hydraulic fluid into the hydraulic circuit via a pressure connection P, and a pressureless reservoir 10 from which the hydraulic pump 8 draws fluid, and which receives the return fluid of the hydraulic circuit via a pressure connection T.

Two stabilizer assemblies 4, 5 can be seen on the right-hand side of FIG. 1. Each stabilizer assembly is associated with a vehicle axle and comprises a stabilizer rod 12 and a linear actuator 14 in FIGS. 1*c* and 1*d*. The linear actuator 14 is a double-acting cylinder/piston unit, the piston dividing the cylinder into two pressure chambers. An operating connection is associated with each pressure chamber. The two operating connections of a stabilizer assembly with their corresponding hydraulic lines are also designated below as a control channel.

FIG. 1*c* shows the stabilizer assembly 4 which is associated with the front axle, its control channel A comprising the operating connections A1 and A2. FIG. 1*d* shows an identical arrangement for the rear axle, the control channel B comprising the operating connections B1 and B2 here.

In the central region of FIG. 1, FIG. 1*b* shows the control unit 6 of the active chassis stabilization system according to the invention. The control unit 6 is coupled with the pressure supply unit 2 via the pressure connections P and T and is coupled with the stabilizer assemblies 4, 5 for the front and rear axles via the operating connections A1, A2, B1 and B2.

The control unit 6 has a plurality of hydraulic valves which can basically be divided into a group of main valves and a group of servo valves. It is characteristic for the main valves here that they have a high throughput of fluid volume for the active actuation of the stabilizer assemblies 4, 5. As a result of the high volume flow through these valves, a relatively great force is required to switch them. Relatively large coils would therefore be required for a direct electromagnetic controlling of the main valves. Apart from the coil size, these coils would also extract an undesirably high power from the vehicle electrics for the direct control of the main valves. In order to avoid this, so-called servo valves or pilot valves are interposed. The servo valves have a low volume throughput and are therefore easy to switch electromagnetically. The actual main valve is actuated by the application of pressure, the application of pressure being controlled by the pilot valves.

One of the main valves is a pre-controlled proportional pressure-limiting valve 16. The pressure-limiting valve 16 is acted upon by a spring so that it is moved into its closed position. To support the spring, the valve may be additionally acted upon with pressure, the extent of the pressure depending on the position of a servo valve 18. The pressure-limiting valve 16 is acted upon further in the direction of its open position by the pump pressure of the hydraulic pump 8. The pressure-limiting valve 16 is connected in front of the entire hydraulic system of the control unit 6 and therefore continuously regulates the entire system pressure as a function of the application of pressure, in particular also regulates the pressure at the operating connections A1, A2, B1 and B2. In this case, the servo valve 18 which is associated with the pressure-limiting valve 16 is an electromagnetically actuated proportional 2/2-way valve which can also be acted upon with pressure on both sides. In a position of rest, it is connected with the reservoir 10 and can change into a blocking position by means of the electromagnetic actuation. Before the hydraulic fluid reaches the servo valve 18 and the pressure connection of the pressure-limiting valve 16 to support the spring, the hydraulic fluid flows through a throttle 20. This throttle 20 reduces the through flow and can finally provide for a pressure difference at the pressure actuating connections of the pressure-limiting valve 16. If the servo valve is in its opened initial position, then the hydraulic fluid is pressureless after passing through the throttle 20. The spring of the pressure-limiting valve 16 is not strong enough on its own, however, to bring the pressure-limiting valve 16 into its blocked position against the applied pump pressure. Through the possibility of actuating the servo valve 18 electromagnetically in a continuous manner, the servo valve 18 can be brought into an increasingly closed position. Thereby, the pressure rises behind the throttle 20 and hence also the pressure at the pressure actuating connection of the pressure-limiting valve 16 which supports the spring. The increasing pressure, which is controlled by the servo valve 18, now acts together with the spring against the pump pressure. Thus, the pressure-limiting valve 16 is moved increasingly into a blocking position. Through the proportional pressure-limiting valve 16 and the proportional servo valve 18, a maximum pressure level of all operating connections is finally established. These two valves may either form an assembly or may be housed separately in a valve housing.

As an alternative to the proportional valves, non-proportional valves may also be used, which are controlled by a variable frequency and can therefore limit the pressure to a given level.

An assembly which likewise consists of a main valve and a servo valve 21 is very similar to the assembly of pressure-limiting valve 16 and servo valve 18 which has just been described. The main valve here is a proportional pressure-reducing valve 22, the servo valve 21 is a proportional 2/2-way valve. The servo valve 21 of the pressure-reducing valve 22 is identical to the servo valve 18 of the pressure-limiting valve 16; therefore, the pre-controlling of the pressure-reducing valve 22 functions in an analogous manner to the pre-controlling of the pressure-limiting valve 16. This valve assembly made up of servo valve 21 and pressure-reducing valve 22 can of course also be installed in the form of two separate valves.

The pressure-reducing valve 22 is installed behind the branching point of the control channels, so that it can only influence the pressure level of the channel B, which is associated with the rear axle. It is the function of the pressure-reducing valve 22 to further reduce, if necessary, the system pressure determined by the pressure-limiting valve 16 for the stabilizer assembly of the rear axle.

The pressure level of the two control channels is established by the pressure-limiting valve 16 and the pressure-reducing valve 22. Which pressure connection of a control channel or which operating chamber of the actuator is to be put under pressure is now controlled by means of a further main valve. This is finally dependent on whether the vehicle is travelling through a left or right bend. This controlling of the two control channels is undertaken by a single 8/2-way valve 24. This valve is acted upon into its basic position by a spring such that the operating connections A1 and B1 are connected with the hydraulic pump 8 and the operating connections A2 and B2 are connected with the reservoir 10. The 8/2-way valve can be acted upon with pressure through the switching of two servo valves 26, 28 and can assume a position in which A2 and B2 are connected with the pump and A1 and B1 are connected with the reservoir 10. The servo valves 26, 28 each are 2/2-way valves which are switched electromagnetically between a blocking position and a through-flow position. The servo valve 26 is blocked in its basic position and the servo valve 28 is opened in its basic position. The two servo valves 26, 28 are switched simultaneously to connect the pressure-actuating connection of the 8/2-way valve either with the pressureless reservoir 10 or the system pressure which is established by the pressure-limiting valve 16.

The actuation of the two servo valves 26, 28 therefore merely brings about an "on-off position" or an activated position and a basic position of the 8/2-way valve 24.

A so-called failure safety valve 30 constitutes a further main valve of the control unit 6. The failure safety valve 30 is a pre-controlled 4/2-way valve and is pre-controlled in an analogous manner to the 8/2-way valve, preferably with identical servo valves 26, 28. The failure safety valve 30 is installed into the control channel A, which is associated with the front axle. In its initial position, this valve is acted upon by a spring such that it connects the operating connections A1, A2, the connection of the hydraulic pump 8 and the connection to the reservoir 10 with each other in a throttled manner. This position is provided for a failure of the system and makes provision that the active chassis stabilization system, damped by the throttles, is brought back into a defined initial state and a certain passive effect of the chassis stabilization system is retained. Generally, of course, the servo valves 26, 28 of the failure safety valve 30 will be activated and will bring the failure safety valve 30 into a position in which the hydraulic pump 8 and the reservoir 10 are connected with an operating connection A1 or A2 respectively.

The servo valves 26, 28 are identical in their function and type of construction, except for the difference that the servo valve 26 is closed in its basic position and the servo valve 28 is open in its basic position. In addition, the servo valves 26, 28 may be identical to ABS valves of a vehicle braking system.

If the electronics fail, the entire chassis stabilization system is short-circuited by means of the failure safety valve 30, i.e. the pressure connection P of the hydraulic pump 8 is connected with the reservoir 10. This short circuit in fact takes place by means of a throttle which is integrated in the failure safety valve, which throttle, however, makes possible such a high volume flow that the system pressure drops to a minimal "residual pressure". This residual pressure is unimportant for the stabilizer assembly 5 of the rear axle; on the front axle, this residual pressure, in connection with the throttled linking of the operating connections A1 and A2, provides for a passive, damped stabilizer performance. The state of the system lies between a "blocking position", i.e. a blocking of the actuator chambers, and a "floating position", i.e. a throttle-free short-circuit of the actuator chambers.

If the system, including the hydraulic pump 8, fails, then the hydraulic circuit is completely pressureless. The operating connections A1 and A2 are coupled with a throttle as before by means of the failure safety valve. Therefore, a passive, damped stabilizer performance is also maintained for the front axle in this case.

A sensor system is provided for monitoring the correct operation of the active chassis stabilization system and for the balancing of sensor data of the vehicle electronics with the hydraulic circuit. The sensor system comprises two pressure sensors 32 which are respectively associated with a control channel, and either a further pressure sensor 34 or a position sensor 36 which recognizes the position of the 8/2-way valve. In the case of discrepancies between the sensor data of the vehicle electronics and the hydraulic data of the hydraulic circuit, this is indicated to the driver of the vehicle by a warning lamp and the active chassis stabilization system switches into a so-called "fail-safe" state. This state corresponds substantially to the state when the electronics fail, in which all the valves are in their basic position.

Figure 3:
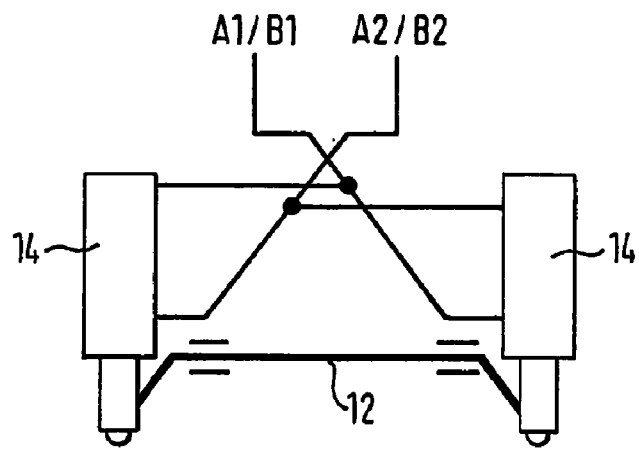
FIG. 3 shows a first alternative embodiment of a stabilizer assembly.
Figure 4:
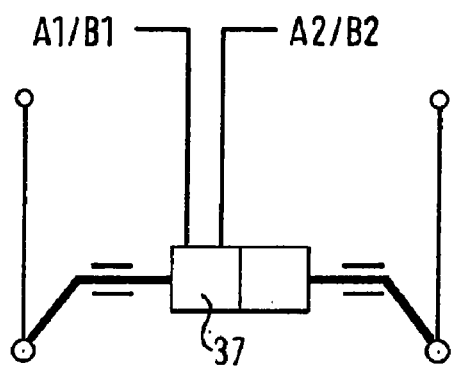
FIG. 4 shows a second alternative embodiment of a stabilizer assembly.

FIGS. 1c and 1d respectively represent a stabilizer assembly 4, 5, in which a linear actuator 14 is respectively associated with an axle. Known alternatives to these stabilizer assemblies are shown in FIGS. 3 and 4. FIG. 3 represents a stabilizer assembly in which a linear actuator 14 is associated with both wheels of a vehicle axle, the linear actuators of an axle being connected in cross-over. FIG. 4 shows a further variant embodiment of a stabilizer assembly in which a rotation actuator 37 or rotary drive is associated with a vehicle axle.

Figure 2:
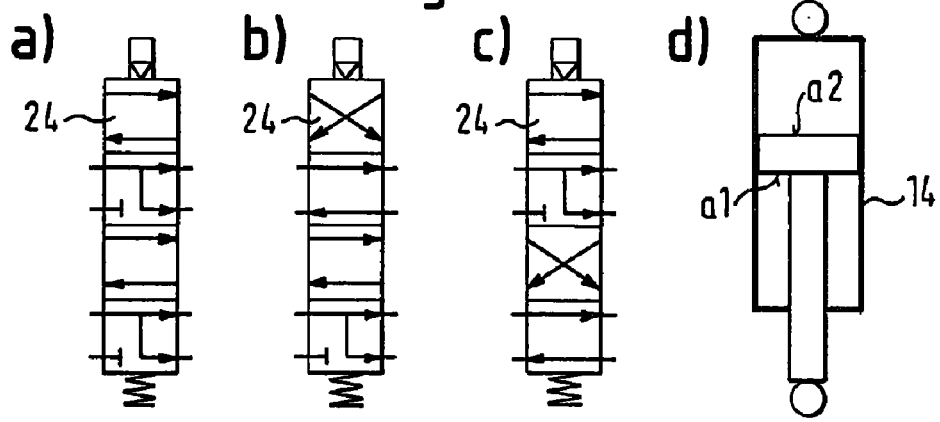
FIG. 2a-d show three variant embodiments of an 8/2-way valve for an active chassis stabilization system according to the invention and a diagrammatic longitudinal section through a linear actuator.

In accordance with the developments and combinations of these stabilizer assemblies, FIG. 2a to c show associated variant embodiments of the 8/2-way valve 24. FIG. 2d shows a linear actuator 14 diagrammatically in section, two surfaces A1, A2 being identified, which are important for the embodiment of the 8/2-way valve 24. The surface A2 here designates the piston surface, the surface A1 designates the piston surface minus the cross-section of the piston rod.

If a linear actuator 14 with an area ratio A1:A2 of approximately 1:1 or respectively a rotation actuator 37 according to FIG. 4 is used respectively for the front and rear axles, then the 8/2-way valve 24 is to be used in accordance with FIG. 1b.

If two linear actuators 14 with an area ratio A1:A2 of approximately 1:2 are used respectively in accordance with FIG. 3 on both axles, then the valve 24 is to be constructed in accordance with FIG. 2a.

If a linear actuator 14 with an area ratio A1:A2 of approximately 1:1 or a rotation actuator 37 according to FIG. 4 is used for the front axle and a linear actuator 14 with an area ratio A1:A2 of approximately 1:2 is used for the rear axle, then the 8/2-way valve 24 according to FIG. 2b is to be used.

Conversely, i.e. if a linear actuator 14 with an area ratio A1:A2 of approximately 1:2 is used for the front axle and a linear actuator 14 with an area ratio A1:A2 of approximately 1:1 is used for the rear axle or with a rotation actuator 37, the 8/2-way valve 24 according to FIG. 2c is to be used.

The differences in the valve pathways of FIGS. 2a to 2c occur in that the dual-acting linear actuator 14 with an area ratio A1:A2 of approximately 1:2 can be controlled like a single-acting linear actuator.

Figure 5:
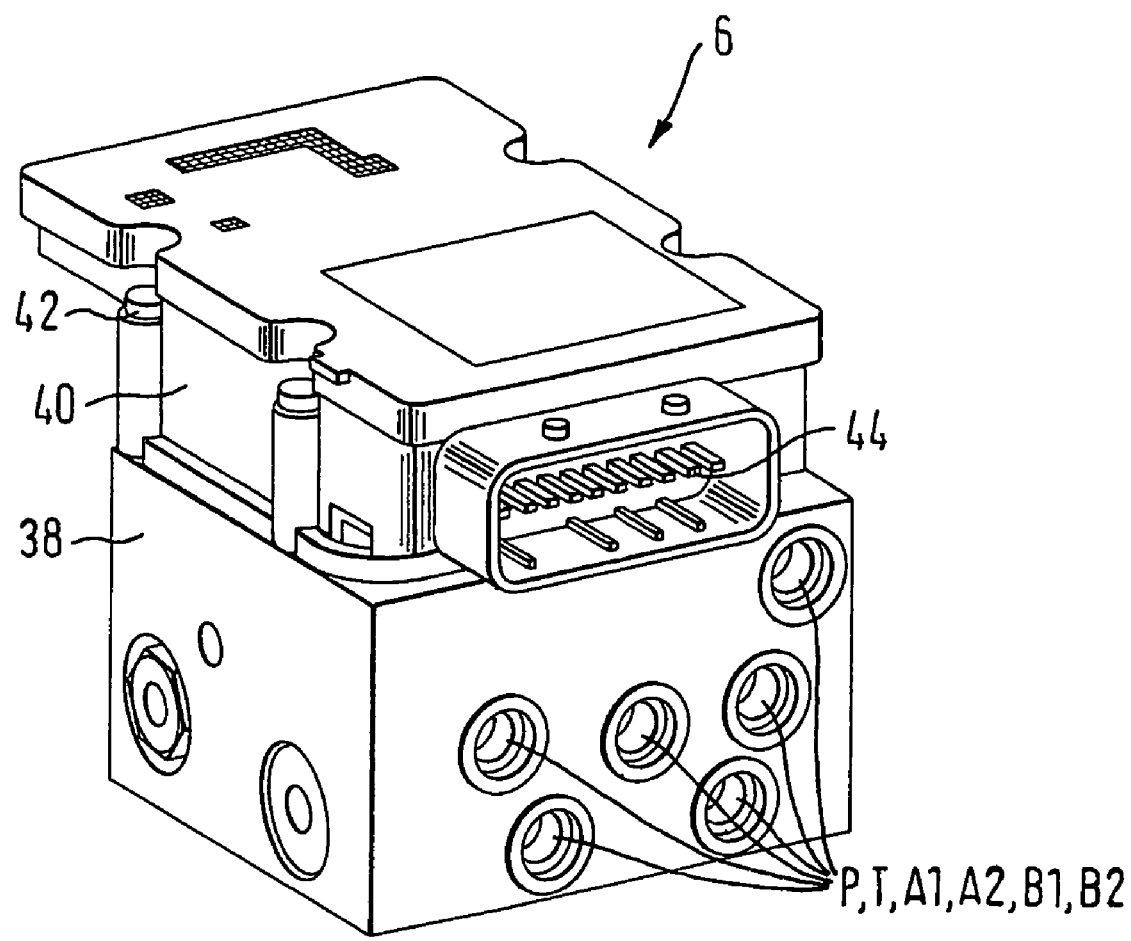
FIG. 5 shows a perspective view of a control unit of compact construction for an active chassis stabilization system according to the invention.

FIG. 5 shows the control unit 6 of an active chassis stabilization system in an integrated construction. The control unit 6 here comprises a valve housing 38 and an electronic switching device 40 which is detachably connected with the valve housing 38 by screws 42.

Two mounted main valves can be seen on the left-hand side of the valve housing 38. The openings on the right are the pressure connections P and T, and also the operating connections A1, A2, B1 and B2.

The electronic switching device 40 has a connection 44 for the current supply and to receive sensor data. The small servo valves 18 and also 26 and 28 are likewise integrated into the valve housing 38, namely in the vicinity of the electronic switching device 40. The coils for activating the servo valves are in fact incorporated into this electronic switching device 40. The electronics, which are more intensive with regard to maintenance and faults, can be exchanged without difficulty through the detachable connection between valve housing 38 and electronic switching device 40 without having to intervene in the hydraulic circuit.

A compact construction of the control unit 6 is possible in spite of the construction of the active chassis stabilization system as a two-channel system. The search for faults in such an active chassis stabilization system is thereby largely limited to a component in which the sensor data are received and processed electronically, the electromagnetic coils control the servo valves accordingly, and in which all the main valves are also integrated alongside the servo valves.

In accordance with the provisions of the patent statutes, the principal and mode of operation of this invention have been explained and illustrated in its preferred embodiments. However, it must be understood that this invention may be practiced otherwise than as specifically explained and illustrated without departing from its spirit or scope.

The invention claimed is:

1. An active chassis stabilization system comprising:
   a hydraulic pressure supply unit,
   a hydraulic stabilizer assembly which is associated with a front axle,
   a hydraulic stabilizer assembly which is associated with a rear axle, and
   a control unit having a pressure-limiting valve and an electromagnetically actuated servo valve for controlling the pressure-limiting valve,
   wherein the servo valve is a proportional 2/2-way valve, and
   wherein the chassis stabilization system is a 2-channel system.

2. The active chassis stabilization system according to claim 1, wherein the control unit has an 8/2-way valve which determines the through-flow paths for both control channels.

3. The active chassis stabilization system according to claim 2, wherein the control unit has two electromagnetically actuated servo valves for switching the 8/2-way valve.

4. The active chassis stabilization system according to claim 1, wherein the pressure-limiting valve is a proportional pressure-limiting valve.

5. The active chassis stabilization system according to claim 1, wherein the pressure-limiting valve controls the pressure level for the stabilizer assemblies of the front and rear axles.

6. The active chassis stabilization system according to claim 1, wherein the control unit has a pressure-reducing valve.

7. The active chassis stabilization system according to claim 6, wherein the pressure-reducing valve is a proportional pressure-reducing valve.

8. The active chassis stabilization system according to claim 6 wherein the control unit has an electromagnetically actuated servo valve for controlling the pressure-reducing valve.

9. The active chassis stabilization system according to claim 8, wherein the servo valve is a proportional 2/2-way valve.

10. The active chassis stabilization system according to claim 6, wherein the pressure-reducing valve controls the pressure level for the stabilizer assembly of the rear axle.

11. The active chassis stabilization system according to claim 1 wherein the servo valves of the pressure-limiting valve and of the pressure-reducing valve are identical.

12. The active chassis stabilization system according to claim 1, wherein the control unit has a 4/2-way valve.

13. The active chassis stabilization system according to claim 12, wherein the 4/2-way valve is a failure safety valve which, in a basic position, connects its four connections in a damped manner.

14. The active chassis stabilization system according to claim 12 wherein the control unit has two electromagnetically actuated servo valves for switching the 4/2-way valve.

15. The active chassis stabilization system according to claim 12, wherein the 4/2-way valve has a device for manual actuation.

16. The active chassis stabilization system according to claim 3, wherein the servo valves for switching the 8/2-way valve and the 4/2-way valve are identical.

17. The active chassis stabilization system according to claim 1, wherein the control unit has at least one pressure sensor per control channel.

18. The active chassis stabilization system according to claim 2, wherein a pressure- or position sensor is provided, in order to establish the switching position of the 8/2-way valve.

19. The active chassis stabilization system according to claim 1, wherein the control unit has at least one electromagnetically actuated valve and a valve housing which receives and couples all the hydraulic valves of the control unit.

20. The active chassis stabilization system according to claim 19, wherein the valve housing has two pressure connections for coupling with the pressure supply unit and two operating connections for coupling with each of the stabilizer assemblies.

21. The active chassis stabilization system according to claim 1, wherein the control unit has an electronic switching device.

22. The active chassis stabilization system according to claim 21, wherein the electronic switching device has a connection for the current supply and for receiving sensor data.

23. The active chassis stabilization system according to claim 21 wherein the electronic switching device has coils for the actuation of electromagnetically actuated valves.

24. The active chassis stabilization system according to claim 19 wherein the electronic switching device is detachably connected with the valve housing.

25. The active chassis stabilization system according to claim 1, wherein the active chassis stabilization system has a maximum of four main valves which control the volume flow for the two stabilizer assemblies.

26. An active chassis stabilization system comprising:
   a hydraulic pressure supply unit,
   a hydraulic stabilizer assembly which is associated with a front axle,
   a hydraulic stabilizer assembly which is associated with a rear axle, and
   a control unit having a proportional pressure-reducing valve,
   wherein the chassis stabilization system is a 2-channel system.

27. An active chassis stabilization system comprising
   a hydraulic pressure supply unit,
   a hydraulic stabilizer assembly which is associated with a front axle,
   a hydraulic stabilizer assembly which is associated with a rear axle, and
   a control unit having a 4/2-way failure safety valve which, in a basic position, connects its four connections in a damped manner,
   wherein the chassis stabilization system is a 2-channel system.

* * * * *